UNITED STATES PATENT OFFICE.

W. R. THOMAS AND M. EMANUEL, JR., OF CATASAUQUA, PENNSYLVANIA.

IMPROVEMENT IN COMPOSITIONS FOR BLASTING-POWDER.

Specification forming part of Letters Patent No. 32,016, dated April 9, 1861.

*To all whom it may concern:*

Be it known that we, W. R. THOMAS and M. EMANUEL, Jr., both of Catasauqua, in the county of Lehigh and State of Pennsylvania, have invented a new and Improved Composition for Blasting-Powder; and we do hereby declare that the following is a full, clear, and exact description of the same.

Our invention consists in the employment of a composition consisting of nitrate of soda or Chili saltpeter mixed with sulphur, ground tanning-bark, and water, in the proportions hereinafter described, for blasting-powder. The proportion in which we mix these ingredients is about as follows: nitrate of soda, three and one-half pounds; flower of sulphur, one and one-quarter pound; ground bark, four and one-half pounds; water, three quarts. The water is first heated to the boiling-point, and the nitrate of soda is then added and dissolved. Into this heated solution the bark is introduced and well stirred until it is perfectly saturated. After this has taken place the sulphur is added, and the composition is now well dried, when it is ready for use.

The principal difference between our blasting-powder and that which is in common use is, first, that we use nitrate of soda, whereas the principal ingredient of ordinary gunpowder or blasting-powder is nitrate of potash. The nitrate of soda is obtained principally in Chili, in very large quantities; but has not been used for gunpowder, doubtless because it is liable to absorb water and to render the powder damp and useless. This difficulty we have overcome by the use of ground bark instead of the charcoal generally employed for gunpowder.

The second difference between our composition and that of ordinary gun or blasting powder consists in the proportion of the different ingredients. The ordinary French mining-powder contains sixty-five per cent. of niter, fifteen per cent. of charcoal, and twenty per cent. of sulphur, and the composition for which a patent was granted May 12, 1857, to A. Murtinedda, of Marseilles, France, contains 32.5 per cent. of niter, 32.5 per cent. of sulphur, 16.25 per cent. of sawdust, 16.25 per cent. of horse-dung, and 2.5 per cent. of common salt, whereas our composition contains 37.83 per cent. of nitrate of soda, 48.65 per cent. of ground bark, and 13.52 per cent. of sulphur, from which it appears that the ground bark, which is the cheapest of the ingredients, constitutes nearly one-half of our composition. This fact, and the fact that we are enabled to use nitrate of soda instead of the much more expensive nitrate of potash, renders our blasting-powder much cheaper than every other composition heretofore proposed for the same purpose, and its effect is not inferior to that of any other blasting-powder now in the market.

What we claim as new, and desire to secure by Letters Patent, is—

The composition or blasting-powder made of nitrate of soda, flower of sulphur, ground bark, and water, in the proportions and manner herein set forth.

W. R. THOMAS.
M. EMANUEL, JR.

Witnesses:
JOHN REILLY,
HENRY BOYER.